US010972507B2

(12) United States Patent
Šebesta

(10) Patent No.: US 10,972,507 B2
(45) Date of Patent: Apr. 6, 2021

(54) CONTENT POLICY BASED NOTIFICATION OF APPLICATION USERS ABOUT MALICIOUS BROWSER PLUGINS

(71) Applicant: MICROSOFT TECHNOLOGY LICENSING, LLC, Redmond, WA (US)

(72) Inventor: Filip Šebesta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 16/132,432

(22) Filed: Sep. 16, 2018

(65) Prior Publication Data

US 2020/0092333 A1 Mar. 19, 2020

(51) Int. Cl.
*H04L 29/06* (2006.01)
*G06F 16/955* (2019.01)
*G06F 9/54* (2006.01)
*G06F 21/56* (2013.01)

(52) U.S. Cl.
CPC .............. *H04L 63/20* (2013.01); *G06F 9/542* (2013.01); *G06F 16/955* (2019.01); *G06F 21/566* (2013.01); *H04L 63/1416* (2013.01)

(58) Field of Classification Search
CPC ..... H04L 63/20; H04L 63/1416; H04L 63/14; G06F 16/955; G06F 9/542; G06F 21/566; G06F 21/55; H04W 12/12
See application file for complete search history.

(56) References Cited

U.S. PATENT DOCUMENTS

| 9,374,381 | B2 | 6/2016 | Kim et al. |
| 9,443,077 | B1 | 9/2016 | Dingle et al. |
| 9,830,453 | B1* | 11/2017 | Feiertag ................ G06F 21/562 |
| 2013/0097659 | A1 | 4/2013 | Das et al. |
| 2014/0047413 | A1* | 2/2014 | Sheive ..................... G06F 8/30 |
| | | | 717/110 |
| 2014/0283068 | A1* | 9/2014 | Call ...................... G06F 21/566 |
| | | | 726/23 |

(Continued)

FOREIGN PATENT DOCUMENTS

| CN | 101894243 A | 11/2010 |
| CN | 105303109 A | 2/2016 |
| WO | 2017213688 A1 | 12/2017 |

OTHER PUBLICATIONS

"International Search Report and Written Opinion Issued in PCT Application No. PCT/US19/038846", dated Aug. 6, 2019, 11 Pages.

(Continued)

*Primary Examiner* — Mahfuzur Rahman
(74) *Attorney, Agent, or Firm* — NovoTechIP International PLLC

(57) ABSTRACT

Disclosed systems and methods include receiving, by a browser application, a web application data including a trusted source rule having a web application user identifier (ID) unique to a user of the web application, and upon determining by the browser application of a violation of the trusted source rule, transmitting a rule violation report, with the web application user ID, to a data processing system for analysis to determine a malicious manipulation of the browser application, and receiving at the user device, from the data processing system, an alert of malicious manipulation of the browser application, corresponding to the rule violation report.

20 Claims, 10 Drawing Sheets

(56) References Cited

U.S. PATENT DOCUMENTS

| | | | |
|---|---|---|---|
| 2015/0033331 A1* | 1/2015 | Stern | H04L 63/1425 |
| | | | 726/22 |
| 2015/0309971 A1* | 10/2015 | Cowley | G06F 9/44526 |
| | | | 715/234 |
| 2016/0323309 A1 | 11/2016 | Sethi et al. | |
| 2018/0302426 A1* | 10/2018 | Lee | H04L 67/02 |
| 2020/0084225 A1* | 3/2020 | McKendall | H04L 63/1466 |

OTHER PUBLICATIONS

"About the User-ID feature" Retrieved from: https:/web.archieve.org/web/20170430093437/https://support.google.com/analytics/answer/3123662?hl=en, Apr. 30, 2017, 5 Pages.

"Browser-Update.org", Retrieved from: https://browser-update.org/, Retrieved on: Jul. 19, 2018, 5 Pages.

"browser-update/browser-update", Retrieved from: https://github.com/browser-update/browser-update/wiki/Details-on-configutaion#notifying-insecure-browsers, Retrieved on Jul. 19, 2018, 3 Pages.

Helme, Scott, "Malware hurting will CSP", Retrieved from: https://scothelme.co.uk/malware-hunting-with-csp/, Dec. 18, 2017, 11 Pages.

Medley, et al., "Content Security Policy (CSP)", Retrieved from: https://web.archive.org/web/20170202193910/https:/developer.mozilla.org/en-US/docs/Web/HTTP/CSP, Feb. 2, 20147, 8 Pages.

Steele, Becky, "How to Detect Online Plugins", Retrieved from: https://web.archive.org/web/20121031130306/https:/smallbusiness.chron.com/detect-malicious-online-plugins-57085.html, Oct. 31, 2012, 4 Pages.

\* cited by examiner

CONTENT POLICY BASED NOTIFICATION OF APPLICATION USERS ABOUT MALICIOUS BROWSER PLUGINS

TECHNICAL FIELD

This disclosure relates generally to web site content security and, more particularly, to detecting and alerting web site access application users of attempted injection of malicious code.

BACKGROUND

Web site content trusted source rules are a web site access application security feature that allows a web page to provide to visiting applications a "white list" of approved content sources, and to block the visiting applications from receiving content from sources not on the list. One technique for providing and managing web site content trusted source rules is Content Security Policy (CSP). CSP can operate with various "browser" applications for accessing web sites and web applications, particularly with modern browser applications that recognize the CSP flags, and can generally prevent such applications from receiving content from sources not on the white list. The CSP can be included, for example, in Hypertext Transfer Protocol (HTTP) response headers on the server side. One example CSP can limit visiting browser applications' receipt of JavaScript (js) files to being loaded only from *.microsoft.com. An example protection provided by such a CSP configuration can include blocking a visiting browser application from executing malicious script injected by an attacker.

However, technical issues of current CSP techniques include lack of providing effective warning to a browser application user of malicious script. In addition, plugins and extensions in modern browser applications are allowed to manipulate the Document Object Model (DOM) of web pages opened in the browser application context. The mechanism may be exploited by malicious plugins and extensions, for example, to inject ads, crypto coin mining tools or other malicious code into the victim's page. CSP can be configured to block such DOM manipulations. However, current CSP techniques do not provide notification to the browser application user that a malicious plugin or extension tried to manipulate the code of the application. The user of the browser application may therefore continue to use it, without knowledge of the malicious plugin.

SUMMARY

This Summary is provided to introduce a selection of concepts in a simplified form, further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An example disclosed system can include a processor and a memory coupled to the processor, the memory storing instructions that when executed by the processor cause the processor to: receive, from a user device executing an application, a request for a web application content, transmit to the user device, after receiving the request for the web application content, a corresponding web application content data and content source rules, the content source rules including a web application user identifier (ID), receive from the web site application a rule violation report, associated with the content source rules, and including an indication of the web application user ID, analyze the rule violation report to determine presence of a malicious modification of the application, and transmit, based at least in part on a result of analyzing the rule violation report, a user alert to a user device associated with the web application user ID, indicating determined presence of a malicious modification of the application.

An example disclosed method can include receiving, by an application executed by a user device, a web application data from a web application, the web application data including a content source rule having a web application user identifier (ID) unique to a user of the web application, determining, by the user device application, whether there is indication of a violation of the content source rule and upon a result of the determining: generating a rule violation report that includes indication of the web application user ID, transmitting the rule violation report to a data processing system, for analysis to determine a malicious manipulation of the user device application, and receiving at the user device, from the data processing system, an alert, the alert indicating a determined malicious manipulation of the user device application, corresponding to the rule violation report.

Another disclosed system can include means for receiving, from a user device executing an application, a request for a web application content and, in response, transmitting to the device a corresponding web application content data and a content source rule, the content source rule including a web application user ID; means for receiving from the user device application a rule violation report, associated with the content source rule, and including an indication of the web application user ID, and analyzing the rule violation report to determine presence of a malicious modification of the user device application; and means for transmitting, based at least in part on a result of analyzing the rule violation report, a user alert to the user device associated with the web application user ID, indicating determined presence of a malicious modification of the user device application.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

Disclosed systems and methods can provide, among other technical features, notification to web site access application users of malicious manipulation of the application. Examples can include, but are not limited to, malicious plugins, extensions, or other add-ons, installed on browser applications. Features can include, but are not limited to, the notification being easy to understand by users. Implementations can include, without limitation, the notification being provided through adaptation and enhancements of current trusted source rule security techniques, and can adapt, for example, whitelist type content source policy techniques, without introducing compatibility issues. In exemplary implementations employing adaption of content security policy (CSP), features can include requiring no browser capability that is additional to the capability of supporting of CSP.

Implementations can include server-side incorporation into a web application's trusted source rules, a web application user identifier and inserting the web application user identifier in the trusted source rules, e.g., CSP, the server sends the web site access (e.g., browser) application. Implementations can also include server-side configuration of the trusted source rules such that, when executed client-side by the web site access application, trusted source violation reports can include the web application user identifier contained in the trusted source rules the web application delivered to the access (e.g., browser) application. Implementations can include server-side transmitting, in response to analysis of trusted source rule violation reports indicating malicious manipulation of the access application, a notice or warning to the user device executing the access application. Such transmission can utilize the web application user identifier carried by the trusted source rule violation report to direct the notice to the user device. Implementations can also include server-side transmitting the notice to other of the user's devices that the user has employed to access the web application.

Figure 1:
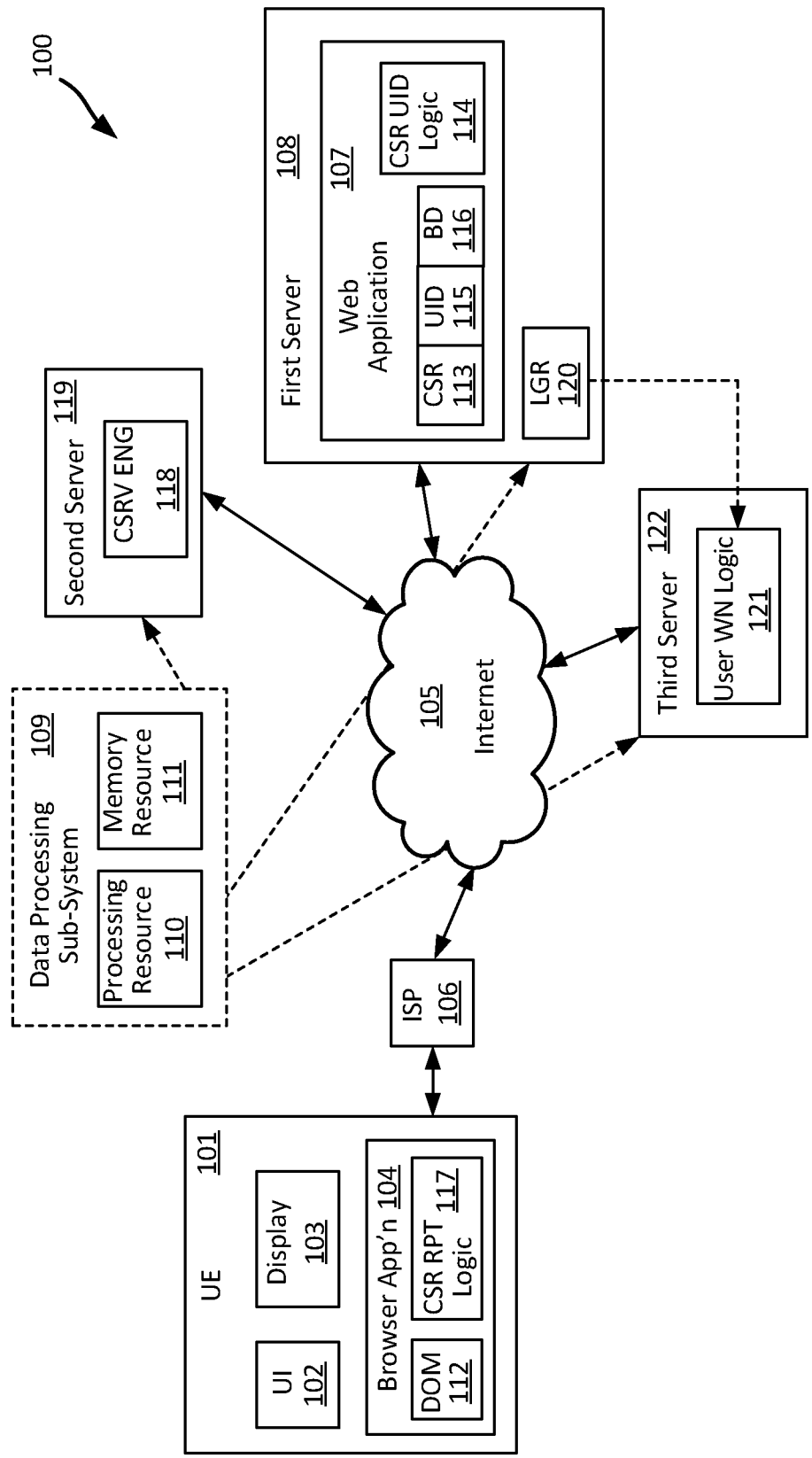
FIG. 1 is a high level functional block diagram of one exemplary implementation of a system for providing web application users a trusted source rule based user notification of malicious modification activity, e.g., malicious plugin activity, on the user's web site access application, according to one or more aspects.

FIG. 1 is a high level functional block diagram of an exemplary implementation of a system 100 that can provide, among other features, user notification of malicious manipulation of web site access applications. Examples can include, without limitation, malicious plugins installed on browser applications. The system 100 can include a user internet access equipment (UE) 101 such as, for example, a personal computer, smartphone, or other end user Internet access device. The UE 101 can include a user interface (UI) 102, e.g., a mouse, keyboard, or touchscreen (not separately visible in FIG. 1), or any combination thereof, and a display 103. The UE 101 can further include, for example, coupled to the UI 102 and display 103, a programmable processor device (not separately visible in FIG. 1) coupled to a memory device (not separately visible in FIG. 1) that can store processor executable instructions that, when executed, can configure the processing device to implement function blocks, and perform processes and operations thereof. Function blocks of the UE 101 can be a include a web site access application, e.g., browser application 104, for accessing through the Internet 105, via an Internet Service Provider (ISP) 106, a web application 107 hosted, for example, by a first server 108. For purposes of description, instances of exemplary operations are referenced to the browser application 104. It will be understood that this is for purposes of convenience, as various features of browser applications that are not necessarily particular to disclosed concepts, but that can be incidental to exemplary operations, are known to persons of skill and are specifically defined by established standards, and therefore detailed description can be omitted. It will also be understood that persons of ordinary skill in the relevant arts, upon reading this disclosure in its entirety, can readily adapt practices described in reference to browser application 104 to non-standard, and even proprietary processes for accessing web sites and web applications. Accordingly, except where explicitly stated otherwise, or made clear from context to have a different meaning, all instances of "browser application 104" will be understood to mean, and to encompass known browser techniques as well as other techniques, regardless of being or standard and non-standard for accessing web applications and web sites.

It will be understood that "server," as used in this disclosure, can be implemented as a virtual resource, and is not necessarily limited to any particular technology, architecture, allocation of functionality to hardware, or any particular geographical distribution of hardware. For example, in one implementation, the system 100 can include a data processing sub-system 109 that can include a programmable processor resource 110 coupled to a memory resource 111. The programmable processing resource 110 and memory resource 111 can be provided, for example, by a cloud computing system (not explicitly visible in the figures) that can include a networked array of server units (not explicitly visible in the figures), interconnected by the Internet 105, or by one or more private networks. The memory resource 111 can be provided by the distributed memory resources of the array of server units, or as a networked plurality of mass storage devices (not explicitly visible in the figures), or a combination of both. The memory resource 111 can store computer executable instructions (not separately visible in FIG. 1) that, when read and executed by the programmable processor resource 110, can cause the resource 110 to implement the first server 108, in combination with other logic or function blocks, including other server blocks, described in greater detail later in this disclosure. In another implementation, the first server 108 can be implemented on a particular server-executable instructions stored on a single commercially web server unit (not separately visible) such as readily available from various commercial vendors.

Referring to FIG. 1, exemplary implementations of the browser application 104 can include, for example, but are not limited to any among Microsoft Edge®, Mozilla Firefox®, Google Chrome®, and Apple Safari®. In one or more implementations, the web application 107 can provide user log-in, e.g., via username (not separately visible in FIG. 1) and user password (not separately visible in FIG. 1), to a web application. It will therefore be understood that "web application," in the context of "web application 107" as used herein, can encompass a website, including a website having passive web pages in combination with web application features.

Functionality of the browser application 104 can include sending to the first server 108 requests for web application content (which can include, but is not limited to, web page content) then receiving and rendering same, e.g., on the display 103. To avoid obfuscation of concepts, and aspects thereof, exemplary implementations will be described assuming web application content is written in HyperText Markup Language (HTML). Accordingly, FIG. 1 illustrates the browser application 104 having capability of constructing a Document Object Model (DOM) 112 or other tree-based object model, for example, upon reception of a new web page (or refreshing of a current web page) of the web application 107, or any other web application visited by the browser application 104. DOM is an established programming interface for HTML and XML documents, defined by "DOM Living Standard—Last Updated Aug. 8, 2018," which is readily available, for example, at <<https://dom.spec.whatwg.org>>. DOM represents the HTML or XML document or page as nodes and objects, to assist programming language connection. Practices of systems and methods according to the present disclosure do not necessarily require configuring DOM in a manner particular to such practices. Accordingly, further detailed description of the DOM 112 is omitted, except in later descriptions of interaction with the DOM 112 by exemplary systems, methods, or operations thereof.

As described above, the web application 107 can be configured to include a web page (not separately labeled). Assuming HTML, an HTML header (not separately visible in FIG. 1) can be associated with each web page of the web application 107. Configuration of the HTML header is not necessarily specific to practices according to this disclosure and, therefore, further detailed description is omitted. In an implementation, each web page can include content source rules 113 (hereinafter, for brevity, alternatively referred as "CSR 113"). The CSR 113 can include a trusted source whitelist (not separately visible) that can specify domains that the browser application 104 should consider as valid sources of executable scripts. One implementation of the CSR 113, including the trusted source whitelist, can be an adaptation of the Content Security Policy (CSP) defined by "Content Security Policy Level 2, W3C Recommendation, 15 Dec. 2016," World Wide Consortium (W3C), which is readily available, for example, at <<https://www.w3.org/TR/CSP2/>>. In an exemplary implementation adapting using and functionality of the CSR 113 other than a web application user ID logic 114 and (labeled "UID Logic" in FIG. 1, and associated web application user ID 115, described in greater detail in later paragraphs, can be according to current CSP techniques. As functionality of current CSP techniques is known, further detailed description of such functionality, other than incidental interfacing with described aspects and operations thereof, is omitted.

The web application user ID logic 114 can be configured to generate and include in the CSR 113, for sending to the browser application 104, a web application user ID 115 (labeled "CSR UID" in FIG. 1) that is unique to the user. The web application user ID logic 114 can be a virtual logic that can be implemented, for example, by one or more "modules" of computer executable instruction stored by the memory resource 111, in combination of computational resources of the programmable processing resource 110. The web application user ID logic 114 can be, but is not necessarily included in a virtual implementation of the first server 108. The web application user ID 115 can be generated based, for example, on a user ID information, such as the FIG. 1 example labeled "IDI," that the browser application 104 can provide, e.g., by to the first server 108. One example IDI can be a user log-in ID (not separately visible in FIG. 1), or portion thereof, that the user of the browser application 104 may enter as part of a log-in procedure associated with accessing the web application 107. The log-in procedure, if used, can be according to conventional techniques and is not necessarily specific to practices according to disclosed systems and methods. Accordingly, further detailed description is omitted. The web application user ID logic 114 can be implemented, for example, as computer-executable instructions, executable by a processor resource (not separately visible in FIG. 1) of the first server 108.

In an implementation, the web application user ID logic 114 can be further configured to generate, or obtain, a browser instance identifier BD 116 and maintain BD 116 in association with the web application user ID 115. BD 116 can be, for example, a random number generated in the browser application 104 and stored in a cookie associated (not separately visible in FIG. 1) with the web application 107 domain. The first server 108 can be configured, for example, such that if such cookie is present during an initialization of the web application 107, the first server 108 can read the cookie and append the BD 116 value to the web application user ID 115 inserted into the CSR 113. Further aspects related to web application user ID 115, and the optional BD 116, are described in greater detail later in this disclosure.

Referring to FIG. 1, functionality of the browser application 104 can include instantiation and performance of a content source rule violation detection/report logic (hereinafter abbreviated, for purposes of brevity, as "CSR RPT logic"), such as the illustrated CSR RPT logic 117. In an implementation, instantiation and performance of the CSR RPT logic 117 can be according to the CSR 113 received by the browser application 104. For example, the CSR 113 can include processor executable instructions, executable by the UE 101, for instantiating and performing the CSR RPT logic 117. In an implementation, the CSR 113 instructions for instantiating and performing the CSR RPT logic 117 can configure the CSR RPT logic 117 to generate, upon detection of a CSR violation, a CSR violation report (hereinafter referred to as "CSR VRPT"), and to transmit the CSR VRPT to a CSR violation report analysis logic, such as the CSR violation report analysis engine 118 (hereinafter referred to as "CSRV engine" 118, labeled "CSRV ENG" 118 on FIG. 1). The CSR 113 can be configured to instantiate CSR RPT logic 117 such that the CSR VRPT includes an indication of the web application user ID 115. The indication can include, or can be, the web application user ID 115. The CSR 113 can be further configured to instantiate CSR RPT logic 117 such that the CSR VRPT includes an indicator of the browser application identifier BD 116 described above, e.g., includes BD 116.

As used in disclosure, "engine" encompasses, but is not limited to, a virtual processing resource configured to perform the engine's described functionality. For example, the CSRV engine 118 can be implemented by resources of the data processing sub-system 109, namely, particular computer executable instructions stored by memory resource 111, causing computational resources of the programmable processing resource 110 to perform browser application manipulation detection, e.g., malicious plugin signature detection.

The CSRV engine 118 can be hosted or supported on a server other than the first server 108, for example, a second server 119. Hosting the CSRV engine 118 on a server other than the server hosting the web application 107 may be preferred for various applications. However, this is not a limitation, and contemplated implementations of systems and methods according to this disclosure can provide the CSRV engine 118, or equivalent, on or in the first server 108 hosting the web application 107.

The second server 119, as described above for the first server 108, can be implemented as a virtual resource, and is not necessarily limited to any particular technology, architecture, allocation of functionality to hardware, or any particular geographical distribution of hardware. For example, the second server 119 can be implemented by resources of the data processing sub-system 109. The implementation can include particular computer executable instructions stored in the memory resource 111, in combination with computational resources of the programmable processor resource 110. In another implementation, the second server 109 can be implemented as particular server-executable instructions stored on a single commercially web server unit (not separately visible) such as readily available from various commercial vendors. The web server unit can be separate from, or the same as a web server unit implementation of the first server 108.

The CSRV engine 118 can be configured to detect, in the CSR VRPT, signatures or other indicators of presence or activity of malicious plugins. The CSRV engine 118 can be configured, for example, to determine the signature from domains from which the plugin code was trying to load the blocked content. Regarding the CSR RPT logic 117 addressing the CSR VRPT to the CSRV engine 118, in an aspect, the CSR 113 as received by the browser application 104 can include the engine 118 URL. The CSR 113 as received by the browser application 104 can also be configured to instantiate and perform the CSR RPT logic 117 such that the CSP VRPT carries the web application user ID 115. Optionally, the CSR RPT logic 117 can be configured such that CSR VRPT carries the BD 116.

In one exemplary general implementation, the CSRV engine 118 can be configured to initiate, based at least in part on a positive result of analyzing the CSR VRPT (where "positive" means malicious plugin signature present), of a communication of a malicious plugin alert to a user device hosting the immediate reporting web browser, e.g., the UE 101 executing browser application 104. The malicious plugin alert can be configured to cause, upon receipt by the UE 101, generation of a visual alert on the display 103, or an audio alarm from an audio source (not separately visible in FIG. 1), or both. One exemplary visual alert is illustrated on FIG. 2E as item 201, which is described in greater detail later.

An implementation of the system 100 can also include a user login instance record 120 (hereinafter referred to as "LGR" 120, and labeled accordingly on FIG. 1) configured to store identifying information for all user devices (e.g., smart phone(s), tablet device(s), etc.) through which the user associated with web application user ID 115 has logged into the application 107. This implementation, in addition to sending a browser application malicious manipulation warning, e.g., malicious plugin alert notice, to the user device hosting the immediate reporting browser (e.g., browser application 104), can provide for sending the same or similar warning to the other user devices appearing in the LGR 120, i.e., other devices associates with instances of logging into or otherwise using the application 107. FIG. 1 illustrates, for purposes of example, the LGR 120 being maintained by the first server 108. In an aspect, other system 100 resources can have access to LGR 120, as described in greater detail later in this disclosure.

In an implementation, the CSRV engine 118 can be configured to send the malicious plugin warning to the user device 101 through a multistep, or indirect route. One example of such communication can include a transmission of an intermediate warning (not explicitly visible in FIG. 1) from the second server 119 to a malicious plugin user notifier module or logic 121 (labeled in FIG. 1 as "User WN Logic 121") illustrated as hosted or supported by a third server 122. The User WN Logic 121 and third server 122 can be configured to respond to the intermediate warning by sending a malicious plugin warning to the user device 101 supporting the reporting browser application 104. Such communication can identify the user device 102, for example, based on web application user ID 115. Optionally, in implementations wherein the CSR 113 includes the browser application identifier BD 116 described above, and the CSR 113 is configured such that the CSR RPT logic 117 includes BD 116 in the CSRV RPT, the User WN Logic 121 and third server 122 can be configured to send a warning to the browser application 104 using BD 116. In an aspect, the User WN Logic 121 and the CSRV engine 118 can be configured to also send the above-described warning, or similar warnings, to the user devices appearing as log-in instances in the LGR 120. In an implementation the third server 122 can be configured to access LGR 120 on the first server 108, as illustrated by a dotted line between items 108 and 120, or to maintain a local copy of LGR 120.

Implementations are not limited to the CSRV engine 118 sending the malicious plugin warnings using the above-described multi-segment communication. In one implementation, for example, the CSRV engine 118 or the second server 119, or both, can be configured to transmit the malicious plugin warning directly to the user device 101 supporting the reporting browser application 104. In an aspect, the CSRV engine 118 can be configured to also directly send malicious plugin warnings to the user devices appearing in the LGR 120.

The third server 122, as described above for the first server 108 and the second server 119, can be implemented as a virtual resource, and is not necessarily limited to any particular technology, architecture, allocation of functionality to hardware, or any particular geographical distribution of hardware. For example, the third server 122 can be implemented by resources of the data processing sub-system 109, e.g., by particular computer executable instructions stored in the memory resource 111, in combination with computational resources of the programmable processor resource 110. In another implementation, the third server 122 can be implemented as particular server-executable instructions stored on a single commercially web server unit (not separately visible) such as readily available from various commercial vendors. The web server unit can be separate from, or the same as a web server unit implementation of the first server 108, or of the second server 119, or of both.

In an implementation, the web application 107 can be hosted by, and the application user ID logic 114, the CSRV engine 118, and the User WN Logic 121 can all provided by the data processing sub-system 109 without any individual server entities, e.g., without one or more among the first server 108, second server 119, and third server 122.

One non-limiting example process on system 100 can include a user of browser application 104 logging into web application 107 hosted by the first server 108. The web application user ID logic 114 can then generate web application user ID 115, based on the user's log-in name, insert it into a user-specific version of the CSR 113, and serve this to the browser application 104. The browser application 104 can then implement the CSR RPT logic 117 according to the received CSR 113. If a malicious extension tries to manipulate the browser application 104 constructed DOM of the victim application page from 108, the rules established by the CSR 113 can block the attempt and send the CSR VRPT report to, for example, the CSRV engine 118 supported by the second server 119. The CSRV engine 118 then analyzes the CSR VRPT for signatures of malicious plugins. If the CSRV engine 118 analysis finds a match, the second server 119 can identify the actual application user (i.e., the user of the browser application 104) by using the web application user ID 115 in the CSR VRPT URL path. The second server 119 can leverage the third server 122, more specifically, the third server 122 User WN logic 121, as a notification server to deliver a warning, e.g., WN, to the user of the application 107 about the malicious activity. A toast or equivalent warning can then pop up in the user's browser application 104, for example, on the display 103.

FIGS. 2A-2E illustrate a snapshot sequence of the FIG. 1 system 100, in one exemplary process in a method for providing, using CSP and malicious browser plugin activity as an example, a trusted source rule based user notification of malicious manipulation activity on the user's web site access application, according to one or more aspects.

For each of the snapshots, features illustrated in solid lines can more directly relate to described operations.

Figure 2A:
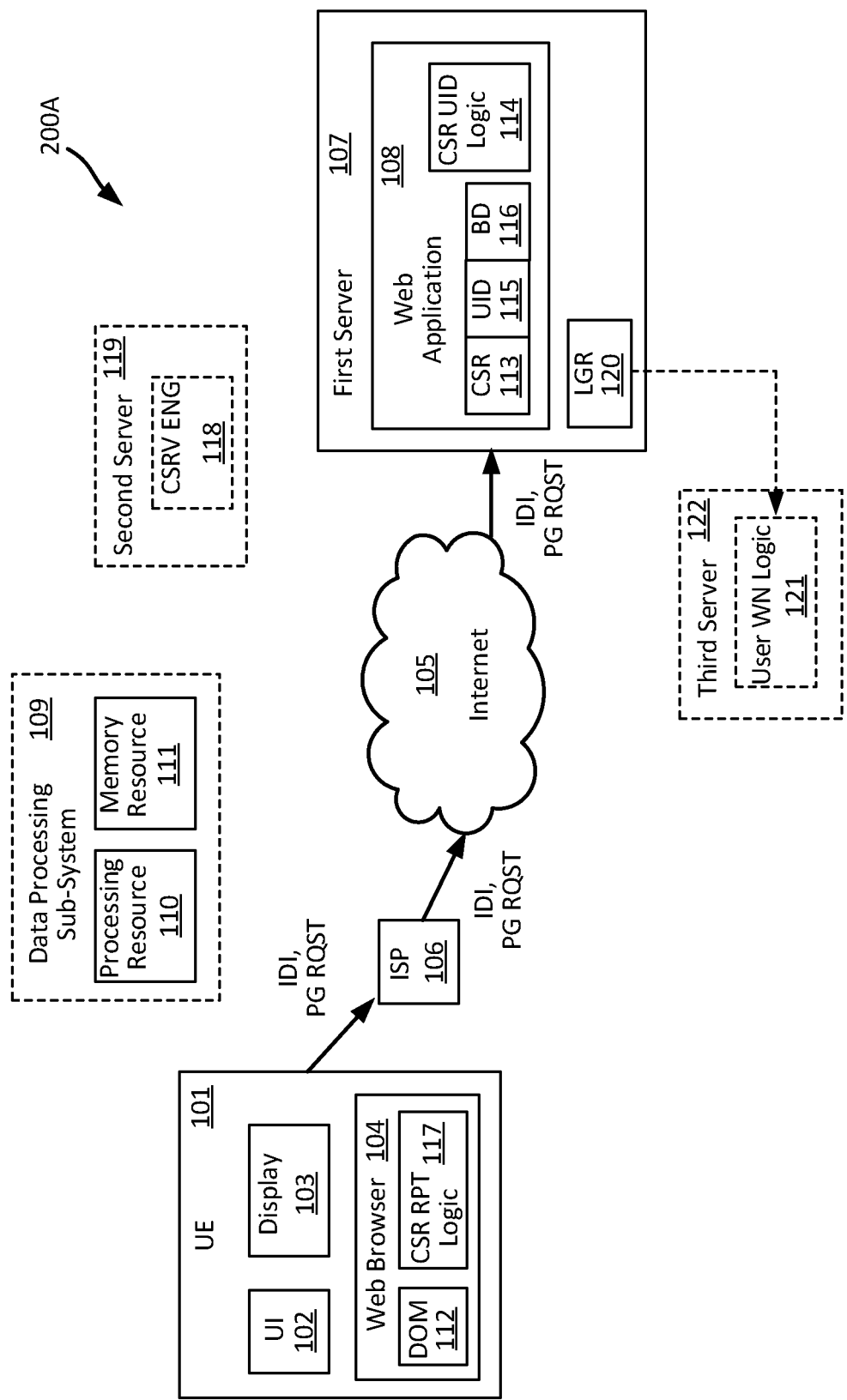
FIGS. 2A-2E illustrate a snapshot sequence of the FIG. 1 system, in one exemplary process in a method for providing, using CSP and malicious browser plugin activity as an example, a trusted source rule based user notification of malicious manipulation activity on the user's web site access application, according to one or more aspects.

Referring to the FIG. 2A snapshot 200A, exemplary operations can include the browser application 104 transmitting, to the first server 108 hosting the web application 107, a user identification information, labeled "IDI" and a page request, labeled "PG RQST." As illustrated, IDI and the page request can pass through the ISP 106 and propagate through the Internet 105 to the first server 108.

Figure 2B:
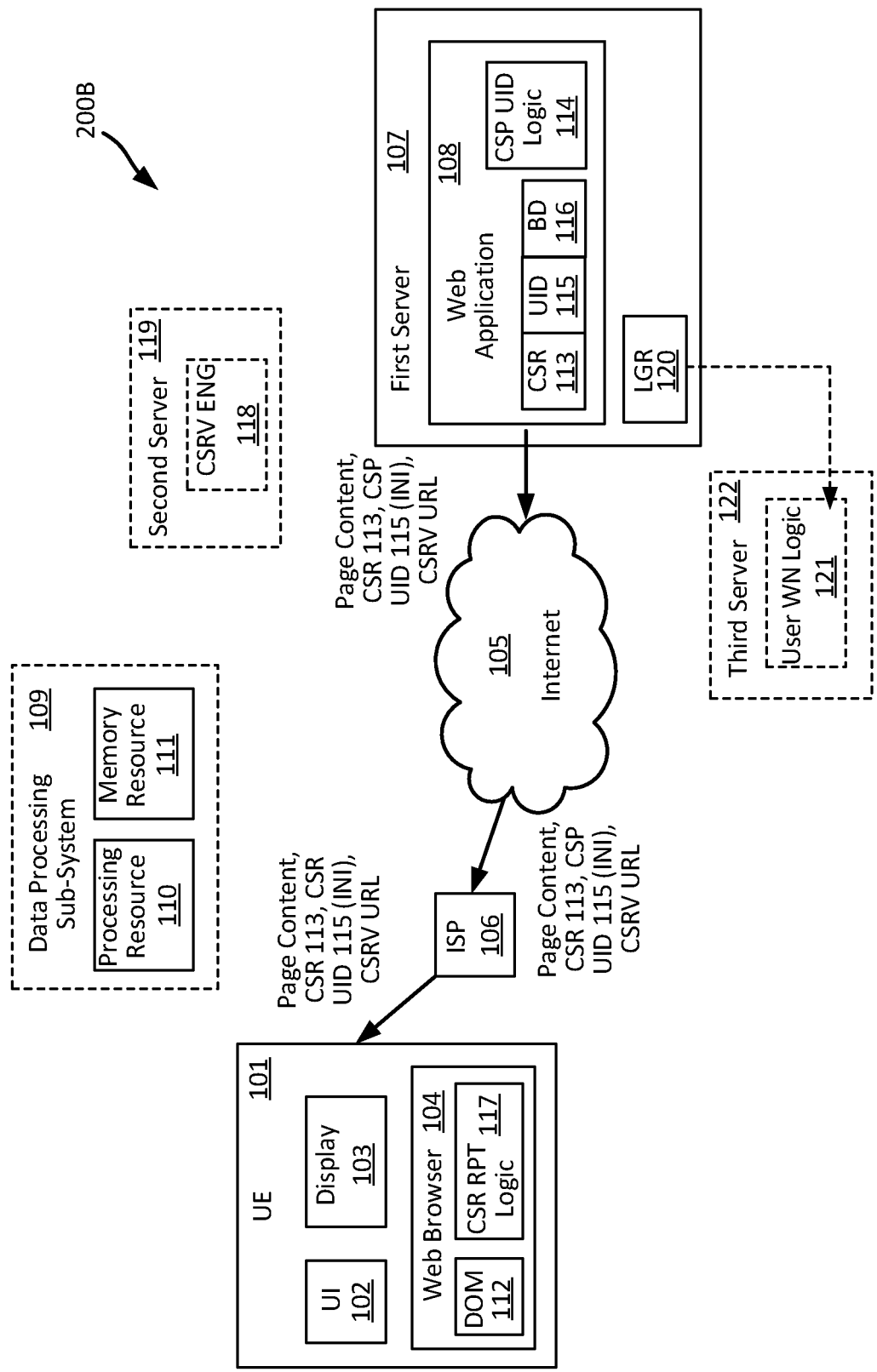

Referring to the FIG. 2B snapshot 200B, the first server 108, in response to receiving IDI and PG RQST, can update the web application user ID 115 based on IDI, and send to the browser application 104 the requested application content of web application 107, along with CSR 113 and the updated web application user ID 115 (labeled "CSP UID 115(ID1)"). In an implementation, CSR 113 can include the URL of the CSRV engine 118 (labeled "CVRS URL"). The CSR 113 can also include the browser identifier BD 116. The browser application 104, in response to receiving the requested page or application content of web application 107 and the CSR 113, can construct a DOM 112, render the received page or application content data, and configure the CSR RPT logic 117 in accordance with the received CSR 113.

During the rendering, the received CSR 113 may prevent the browser application 104 from receiving or executing script from a source not on the CSR 113 whitelist. For purposes of description it will be assumed that prior to or during the rendering an attacker installs a malicious plugin on the web browser 104, of the type that attempts to manipulate the constructed DOM 112. It will therefore be assumed that the CSR RPT logic 117 detects the manipulation and, in response, generates a CSR violation report, e.g., CSR VRPT and, referring to FIG. 2C snapshot 200C, sends same to the URL of the CSRV engine 118. In an aspect, CSR VRPT can include the web application user ID 115 (labeled on FIG. 2C as "UID") of the user associated with browser application 104 that visited the web application 107 and sent PG RQST. The CSR RPT logic 117 can obtain the URL of the CSRV engine 118 and the web application user ID 115 from the CSR 113 received in FIG. 2B snapshot 200B, as described above. Optionally, the CSP VRPT can include the browser identifier BD 116, which the CSR RPT logic 117 can obtain from the received CSR 113.

Figure 2C:
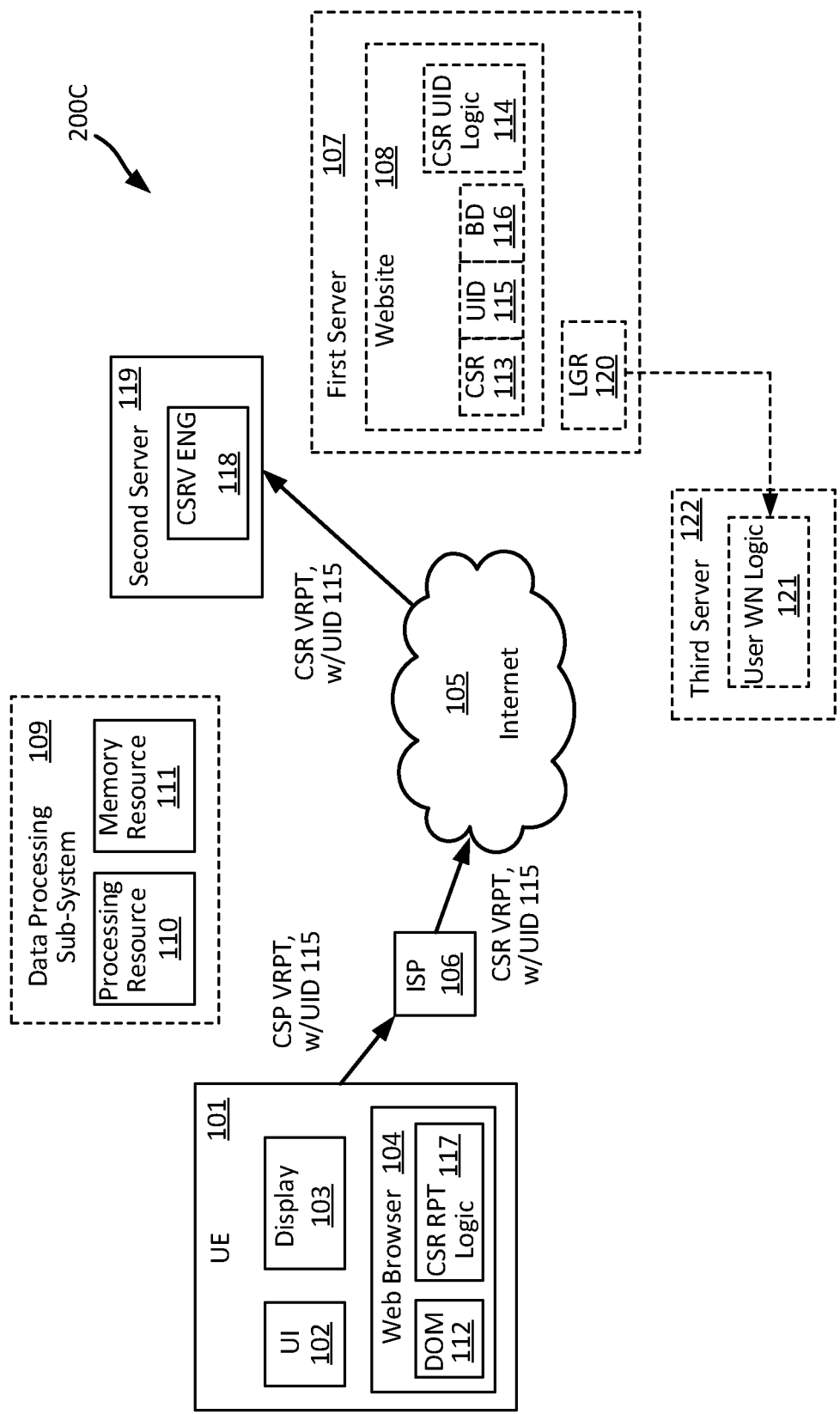
Figure 2D:
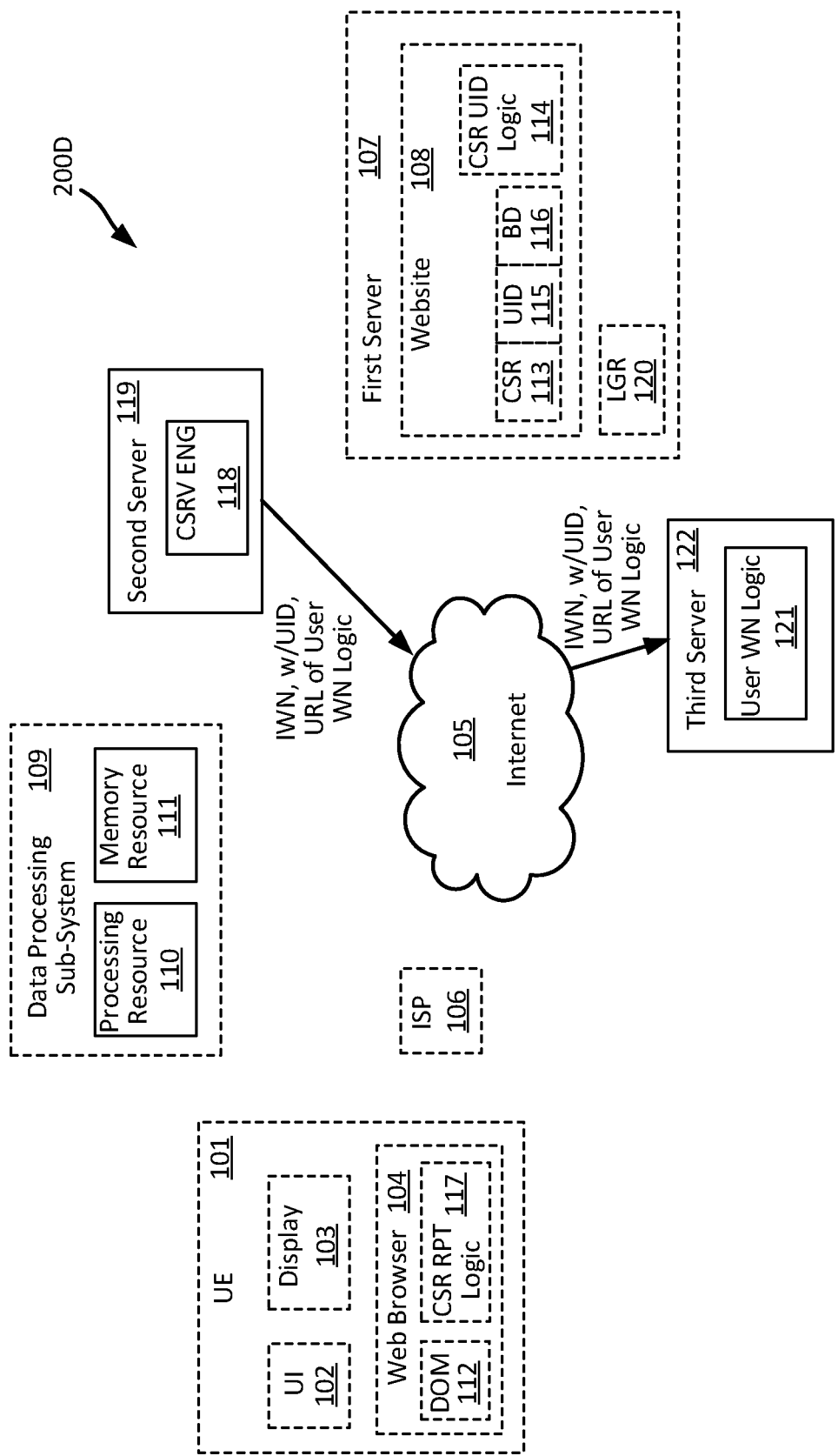

Continuing with description of the FIG. 2A-2E snapshots, upon the CSRV engine 118 receiving the CSP VRPT, illustrated in FIG. 2C as being sent by the browser application 104 CSR RPT logic 117, the CSRV engine 118 can apply to the CSP VRPT a malicious manipulation signature analysis or process. The malicious manipulation signature analysis or process can be configured, for example, as a malicious plugin signature detection analysis or process. Assuming for purposes of description that engine 118 detects a malicious manipulation (e.g., plugin) signature, the engine 118 can communicate (not explicitly visible in FIGS. 2A-2E) a warning to, or destined for the user device 101 hosting or otherwise executing the browser application 104. Such communication can be performed, for example, using the web application user ID 115 carried by the CSR VRPT. Optionally communication of the warning to, or destined for the user device 101 can utilize the browser identifier BD 116 which, as described above, the CSR RPT logic 117 can be configured to include in the CSP VRPT. In an implementation of the system 100, the communication can be an indirect process, which can include the CSRV engine 118 sending, as illustrated in the FIG. 2D snapshot 200D, an intermediate warning IWN to the user WN logic 121, and the logic 121, in response sending, to the browser 104 application, as illustrated in the FIG. 2E snapshot 200E, a malicious manipulation warning, such as malicious plugin warning WN. Also illustrated by FIG. 2 snapshot 200E, the browser application 104, or other resources of the UE 101 can respond to WN by displaying a warning 201 on the display 103.

Referring to FIGS. 1 and 2A-2E, it can be understood that disclosed systems can include means for receiving, from a device executing a browser application, a request for a web application content and, in response, transmitting to the device a corresponding web application content data and a content source rule, the content source rule including a web application user ID. It will be understood that disclosed systems can include, in addition, means for receiving from the browser application a rule violation report, associated with the content source rule, and including an indication of the web application user ID, and analyzing the rule violation report to determine presence of a malicious modification of the browser application. It will be understood that disclosed systems can include, in further combination, means for transmitting, based at least in part on a result of analyzing the rule violation report, a user alert to a user device associated with the web application user ID, indicating determined presence of a malicious modification of the browser application. In an aspect, the content source rule can include instructions for the browser application to include, in the rule violation report, the browser identifier, and transmitting the user alert to the user device is based, at least in part, on the browser identifier in the received rule violation report. Additionally, the content source rule can be included in a Content Security Policy.

Figure 3:
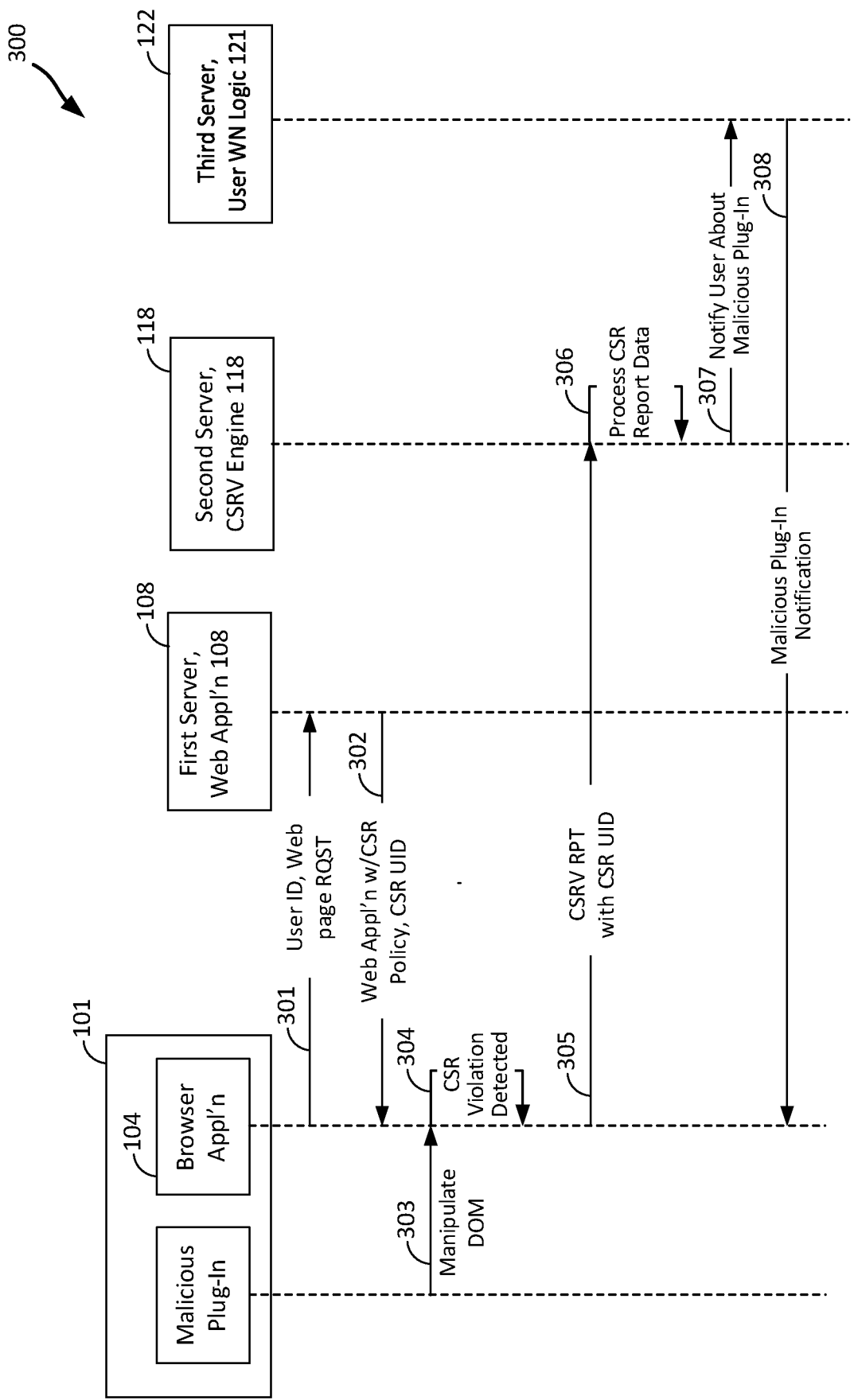
FIG. 3 is a timing diagram of exemplary operations in one process, referencing the FIG. 1 system implementation and CSP and malicious browser plugin activity as examples, in a method for providing a trusted source rule based user notification of malicious manipulation activity on the user's web site access application, according to one or more aspects.

FIG. 3 is a timing diagram of exemplary operations in one process, referencing the FIG. 1 system 100 and CSP and malicious browser plugin activity as examples, in a method for providing a trusted source rule based user notification of malicious manipulation activity on the user's web site access application, according to one or more aspects.

For convenience to the reader and to avoid obfuscation with description not particular to disclosed concepts, exemplary operations in the process 300 will be described in reference to the FIG. 1 system 100. An exemplary instance of the process can begin at 301, where the user browser application 104 can send a log-in communication to the first server 108, to access its web application 107, and a page request to receive web application or web page data. The log-in aspect of the communication can include a user identification IDI. The first server 108, in response, can update the web application user ID 115 of its CSR 113 based on the user-specific IDI, and then at 302 send to the browser application 104 an HTML header with a copy of CSR 113. The copy of CSR 113 can include the updated web application user ID 115, along with the requested web page or web application data. The copy of the CSR 113 can also include the URL of the system resource that analyzes CSR violation reports, which for this example is assumed to be the CSRV engine 118 supported by the second server 119.

The browser application 104, upon receiving the communication at 302 can proceed to construct a DOM (e.g., FIG. 1 DOM 112) for the web page data or web application data and to render the page, e.g., for display on the UE display 103. The browser application 104 can also, based at least in part on the CSR 113, instantiate the CSR RPT logic 117 for determining if the CSR 113 has been violated and, if so, sending the above-described CSR VRPT to the CSRV engine 118. For purposes of description, this instance will assume that a malicious plugin (visible in FIG. 3 but not separately numbered) has installed itself on the user's web browser 104 and, for example, during the rendering process, has attempted to manipulate the DOM. Accordingly, at 304 the CSR RPT logic 117 can detect the CSR violation and, at 305, can send the CSR VRPT to the CSRV engine 118. The CSRV engine 118, in response, can analyze the CSR VRPT at 306 to determine whether the CSR violation was actually due, or likely due, to manipulation of the DOM by a malicious plugin. The presently described instance of the process 300 assumes such DOM manipulation and, accordingly, the analysis at 306 has a positive result. Accordingly, the CSRV engine 118 can send, at 307, an intermediate notification, such as the FIG. 2D IWN, to the user notification logic 118 that, in this example, is supported by the third server 122. The notification logic 118, in response, can send at 308 a notification of malicious plugin to the user's web browser 104. The browser application 104, in response, can alert the user, e.g., by the malicious plugin warning WN illustrated in FIG. 2E. In addition, after or concurrent with the sending at 308, the notification logic 121 can send (not explicitly visible in FIG. 3) malicious plugin warning to all devices appearing as log-in instances in the LGR 120.

Figure 4:
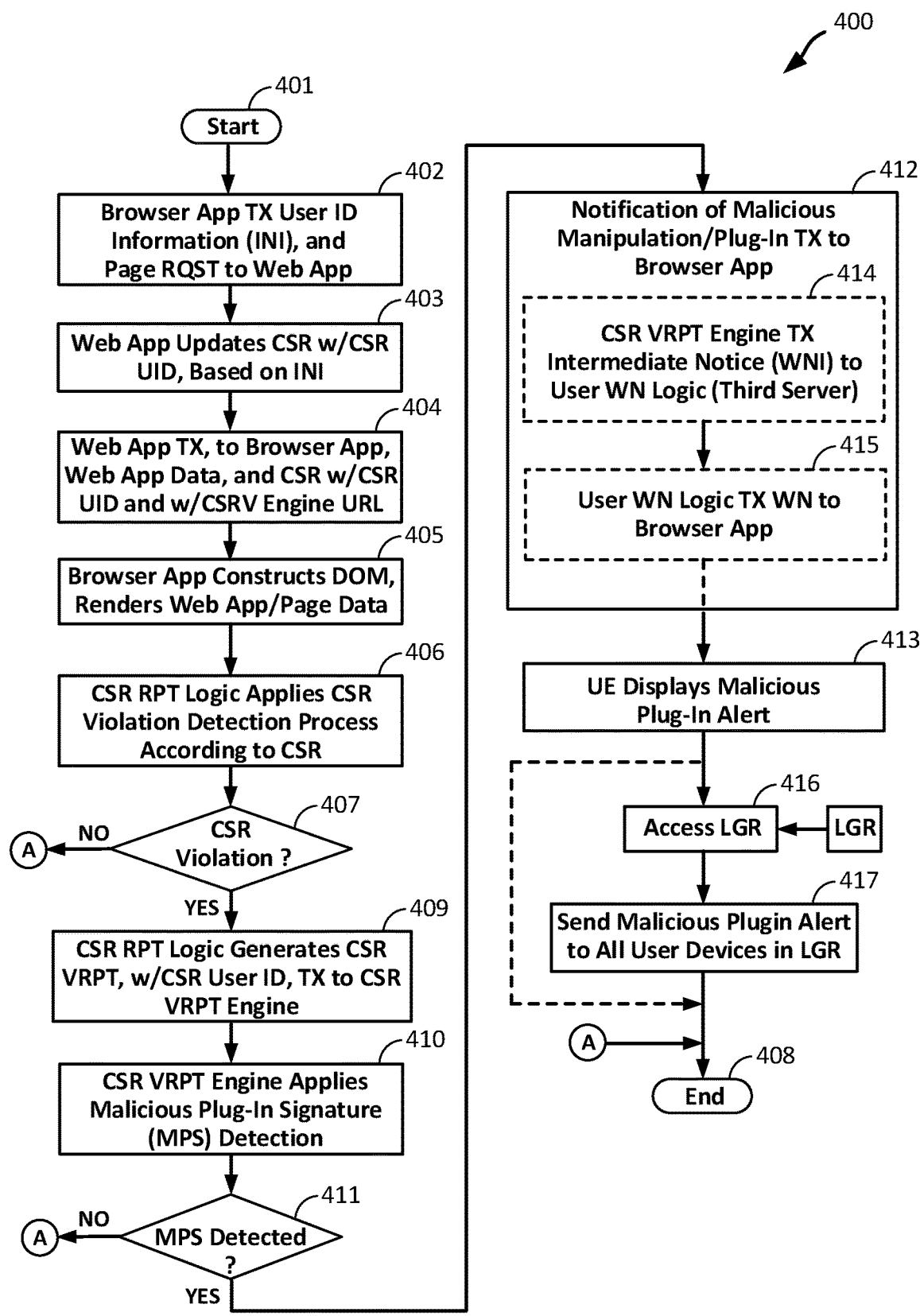
FIG. 4 is a flow chart illustrating one logic flow of exemplary operations, referencing CSP and malicious browser plugin activity for purposes of example, in one implementation of a method for a trusted source rule based user notification of malicious manipulation activity on the user's web site access application, according to one or more aspects.

FIG. 4 is a flow chart illustrating one logic flow 400 of exemplary operations, referencing CSP and malicious browser plugin activity for purposes of example, in one implementation of a method for a trusted source rule based user notification of malicious manipulation activity on the user's web site access application, according to one or more aspects.

An exemplary instance of the flow 400 can begin at an arbitrary start 401 and proceed to 402 where a user's browser application, e.g., the FIG. 1 browser application 104, can send to a web application a user identification information, labeled "IDI" on FIG. 4, and a page request to receive web page data, labeled on FIG. 4 as "PG RQST." In one implementation, IDI can be an explicit user ID, such as the log-in user ID described above. In another implementation, IDI can be extracted by the website or web application, e.g., the above-described web application 107, from the PG RQST or from other information the web browser communicates to the web application. It will be understood that "extracted by the website," in this context, can encompass actions such as extracted or determined by the web application, or by the server hosting the web application.

Referring again to FIG. 4, the flow 400 can proceed from 402 to 403 where the web application can update, based on IDI, a CSR associated with the requested web page or requested web application data to include a user identifier, e.g., can update CSR 113 with the above-described web application user ID 115. The flow 400 can then proceed to 404, where the website can, in response to the page request received at 402, transmit to the browser application 104 the requested web page or web application data, with an HTML header with a copy of CSR 113 having the updated web application user ID 115. The copy of the CSR 113 can also include the URL of a system resource, e.g., the FIG. 1 CSRV engine 118 supported by the second server 119, that analyzes CSR violation reports. Alternatively, the system resource implementing the CSR engine 118 can be the server, e.g., the first server 108, hosting the web application 107.

Referring to FIG. 4, the flow 400 can proceed from 404 to 405, where the browser application can render the web page, e.g., for display on a device such as the FIG. 1 UE display 103. Included with rendering the web page or web application data, the browser application 104 can construct a DOM, e.g., the FIG. 1 DOM 109. The flow 400 can then proceed to 406 and apply a CSR violation detection process, having detection parameters based at least in part on the received CSR 113, and then to flow decision block 407 for flow routing depending on a result of the 406 analysis. If the analysis at 406 does not identify a CSR violation, the flow 400 can proceed from the "NO" outbranch of block 407 to the process end at 408. If the analysis at 406 identifies a CSR violation, the flow 400 can proceed from the "YES" outbranch of block 407 to 409, where operations can be applied to generate and transmit a CSR violation report, such as the CSR VRPT described above. Operations at 409 can set the destination of the CSR violation report in accordance with the URL of the system's CSR violation report analysis resource (e.g., the URL of the FIG. 1 CSRV engine 118) which as described above can be included in the CSR 113.

Figure 2E:
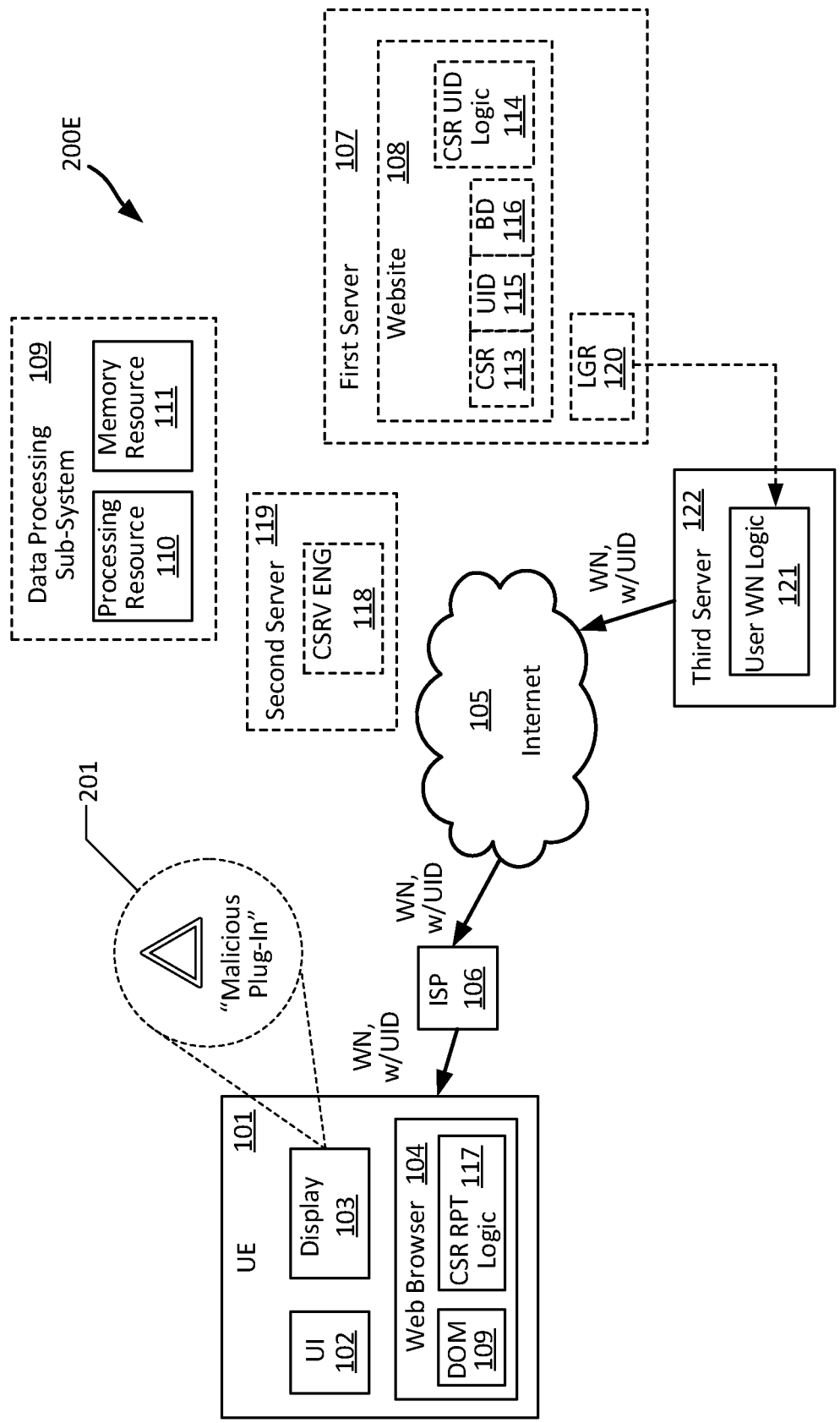

Referring to FIG. 4, the flow 400 can proceed from 409 to 410, where the system's CSR violation report analysis resource, e.g., the FIG. 1 CSRV engine 118 supported by the second server 119, can analyze the violation report to determine whether the CSR violation was actually due, or likely due, to manipulation of the DOM by a malicious plugin. If the result of the 410 analysis is negative, the flow 400 can proceed from the "NO" outbranch of the flow decision block 411 to the process end at 408. If the result of the 410 analysis is positive, the flow 400 can proceed from the "YES" outbranch of the flow decision block 411 to 412, where operations can be applied to send a malicious plugin notification to the web browser, for display at 413 on a user equipment, in manner such as 201 on display 103, as illustrated in FIG. 2E. In an aspect, operations at 412 can include a direct transmission (not separately visible in FIG. 4) to the web browser from the system resource that performed the analysis at 410, e.g., directly from the FIG. 1 second server 119 to the user device 101 supporting the web browser 104. In another aspect, operations at 412 can include an intermediate transmission at 414 (e.g., the FIG. 2D transmission of IWN), from the system resource performing the analysis at 410, to a web browser malicious plugin notification resource, e.g., the FIG. 1 user WN logic 121 shown as supported by the third server 122, for subsequent transmission, at 415, of a malicious plugin notice (e.g., the FIG. 2E transmission WN) to the user device 101. In an aspect, the flow 400 can proceed from 410 to 416, where operations can access the LGR 120 and then to 417, where operations can be applied to send another malicious plugin warning to one or more of the devices appearing as log-in instances in the LGR 120.

Figure 5:
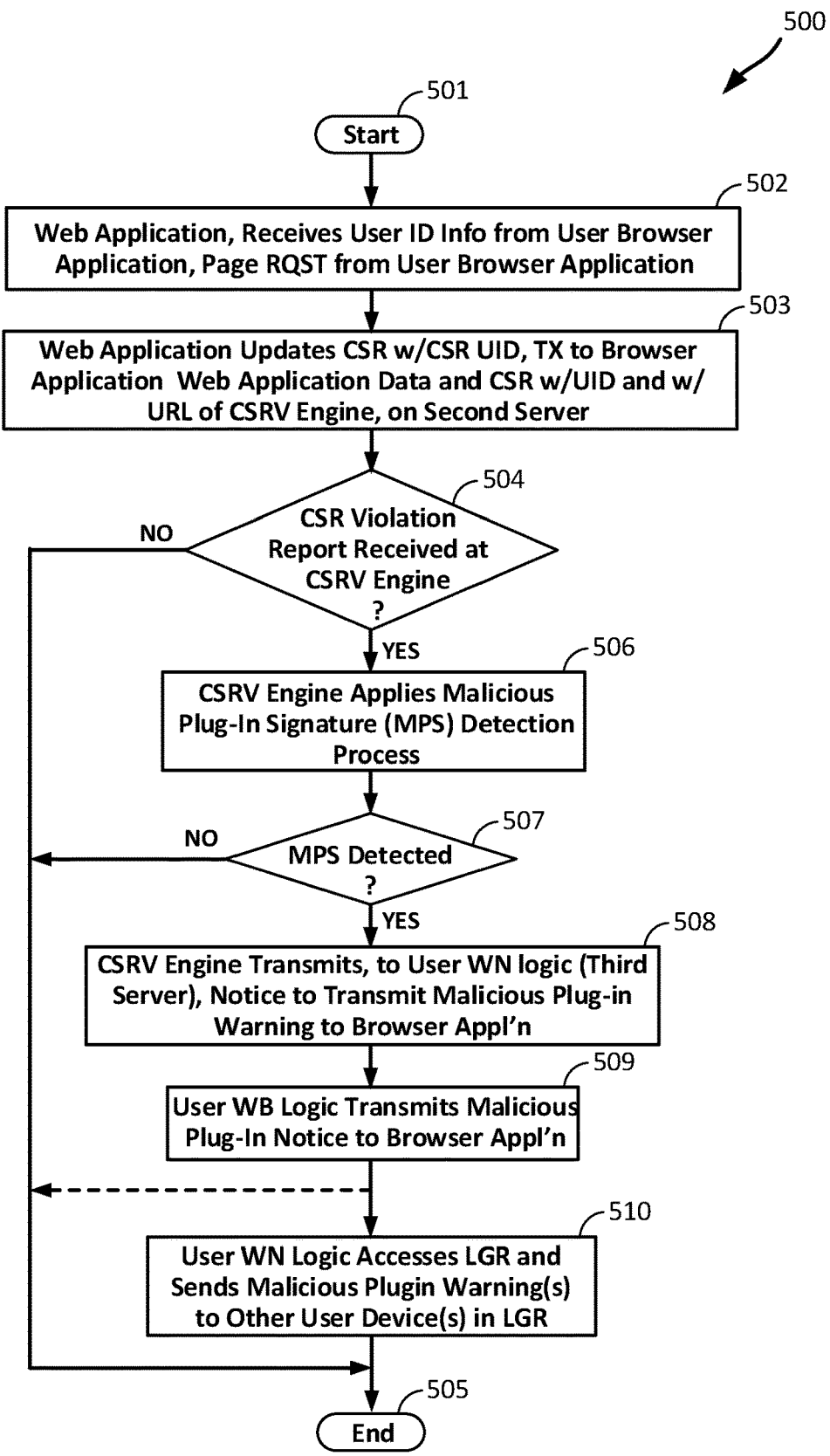
FIG. 5 is a flow chart illustrating one logic flow, referencing CSP and malicious browser plugin activity for purposes of example, of exemplary operations performed by one server-resident system implementation for trusted source rule based user notification of malicious manipulation activity on the user's web site access application, according to one or more aspects.

FIG. 5 is a flow chart illustrating one logic flow 500, referencing CSP and malicious browser plugin activity for purposes of example, of exemplary operations performed by one server-resident system implementation for trusted source rule based user notification of malicious manipulation activity on the user's web site access application, according to one or more aspects. An exemplary instance of the flow 500 can begin at an arbitrary start 501 and proceed to 502 where a system first server, hosting a website, can receive user identification information and a page request (labeled "Page RQST on FIG. 5), from a user's web browser. One exemplary implementation of 502 can be provided by the FIG. 1 first server 108, hosting web application 107, receiving from the browser application 104 a user log-in or other identifying information and a page request. The flow 500 can proceed from 502 to 503, where the system first server can update, based on the user identifying information received at 502, a CSR for the requested page to include a user identifier, e.g., the FIG. 1 web application user ID 115. Operations at 503 can also include the first server 108 transmitting to the browser application 104 requested page data, along with the CSR that includes the web application user ID, and indicates the URL of the system resource for analyzing CSR violation reports, e.g., the URL of the CSRV engine 118.

Referring to FIG. 5, an instance of the flow 500 can proceed from 503 to 504, which can be a wait or a background interrupt state. Operation at 504 can be performed, for example, by the system resource for analyzing CSR violation reports, e.g., the FIG. 1 CSRV engine 118, supported by the second server 119. Such operations at 504 can include a time-out (not separately visible in FIG. 5) that, if expiration is reached without receiving a CSP violation report, can cause the flow 500 to proceed from the "NO" outbranch of 504 to the process end at 505. In an aspect, upon the system resource for analyzing CSP violation reports (e.g., the FIG. 1 CSRV engine 118), receiving a CSR violation report before such expiration, the flow 500 can proceed from the "YES" outbranch of 504 to 506, where that resource can apply a malicious plugin signature (abbreviated "MPS" in FIG. 5) analysis. If the MPS detection process at 506 produces a negative result, the flow 500 can proceed to the process end at 505. If the MPS detection process at 506 has a positive result, the flow 500 can proceed from the "YES" outbranch of block 507 to 508, where operations can be applied to cause the CSRV engine 118 (supported for example, by the second server 119) to transmit to the user WN logic 121 a notice or instruction (e.g., the FIG. 2D snapshot 200D WNI) to transmit to the user device associated with the browser application (e.g., FIG. 1 UE 101 supporting browser application 104) a malicious plugin warning. The flow 500 can then proceed from 508 to 509, where the WN logic 121 (supported for example by the third server 122) can transmit to the UE 101, a warning or notice (e.g., the FIG. 2E WN) of malicious manipulation of the browser application, e.g., by a malicious plugin, and then proceed to the process end at 505. In an aspect, the flow 500 can proceed from 509 to 510, where operations can access the LGR 120 and send another malicious plugin warning to one or more of the devices appearing as log-in instances in the LGR 120.

Figure 6:
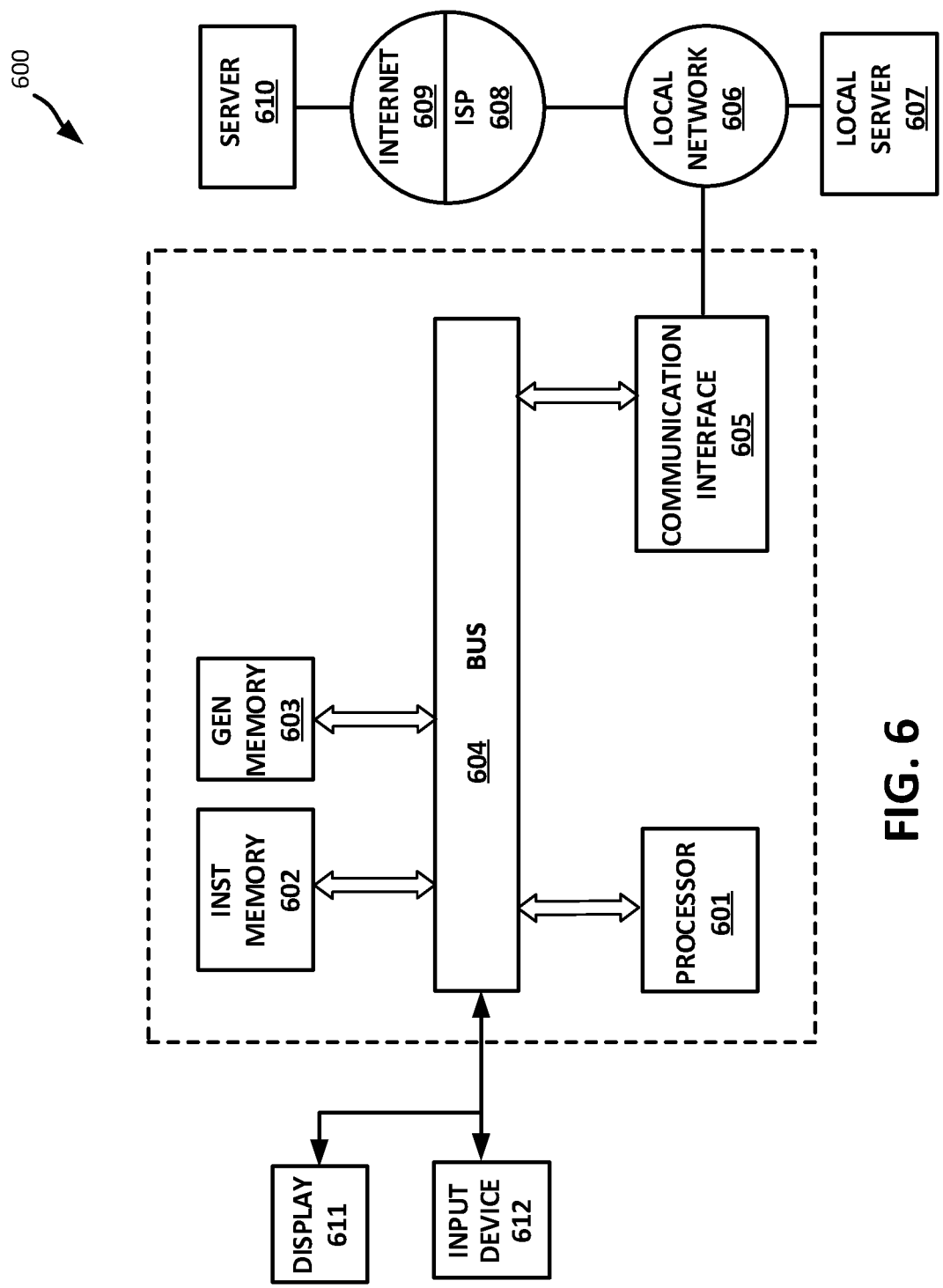
FIG. 6 is a functional block diagram of an example general purpose programmable processor device, configurable to provide and according to various processes and features according to the present disclosure.

FIG. 6 is a functional block diagram of a processor 600, configured to perform operations and processes in systems and methods according to the present disclosure. It will be understood that functional blocks illustrated in FIG. 6 are logical blocks, and do not necessarily correspond to particular hardware.

Referring to FIG. 6, the processor 600 can include a data processor 601, a general purpose memory 602, and an instruction memory 603 coupled by a bus 604. The instruction memory 603 can include a tangible medium retrievably storing computer-readable instructions that when executed by the data processor 601 cause the processor to perform operations in accordance with the flow diagrams of FIGS. 3-5, and as described in reference to FIGS. 1, and 2A-2E. The processor 600 can include a communication interface 605, to a local network 606, which can connect to a local server 607. The local network 606 can also connect, through an Internet Service Provider (ISP) Internet 608, and to the Internet 609. The local network 606 can access a remote server 610 through the Internet. The processor 600 can include a display 611. In an aspect, the display 611 can have sufficient area or other capability to provide concurrent display, and usability, of spreadsheet and GUI line editor. The processor 600 can include an input device 612, e.g., a touchscreen, mouse, keyboard, or voice interface.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any such first, second relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Therefore, the following claims are hereby incorporated into the Detailed Description, with each claim standing on its own as a separately claimed subject matter.

What is claimed is:

1. A data processing system for detecting a malicious modification of a browsing application, comprising:
   a processor; and
   a memory, coupled to the processor, storing instructions that when executed by the processor, cause the data processing system to:
      receive, via a communication network from a first device executing a browsing application, (i) a request for a web application content and (ii) identification information unique to a user for accessing the web application content using the browsing application;
      in response to receiving the identification information, generate a web application user identifier (ID) unique to the user;
      transmit, to the first device via the communication network, web application content data including (i) the requested web application content and (ii) trusted content source rules including a list of trusted sources of content and the web application user ID;
      receive, from the first device via the communication network, a rule violation report generated by the first device based on the list of trusted sources of content, the rule violation report including the web application user ID and indicating that the browsing application has executed content from a source that is not included in the list of the trusted sources of content;
      determine, based on the received rule violation report, that a malicious modification of the browsing application has occurred at the first device; and
      in response to determining the occurrence of the malicious modification of the browsing application at the first device, transmit, via the communication network to one or more devices associated with the web application user ID, an alert indicating the occurrence of the malicious modification of the browsing application.

2. The data processing system of claim 1, wherein the rule violation report includes indication of manipulation of a tree structure object model of the web application content data.

3. The data processing system of claim 1, wherein the list of trusted sources of content includes a trusted source whitelist.

4. The data processing system of claim 1, wherein:
   the trusted content source rules are implemented with a Content Security Policy, and
   the instructions, when executed by the processor, further cause the data processing system to configure the Content Security Policy to include instructions for the browsing application to include, in the rule violation report, the indication of the web application user ID.

5. The data processing system of claim 1, wherein the malicious modification of the browsing application includes an installation of a malicious plugin on the browsing application.

6. The data processing system of claim 1, wherein:
   the identification information includes a log-in identifier (ID) that is unique to the user for accessing the web application content, and
   the web application user ID is generated based on the log-in ID.

7. The system of claim 6, wherein the instructions, when executed by the processor, further cause the data processing system to:
   maintain a login instance record, and
   store information identifying the one or more user devices associated with the web application user ID,
   wherein the alert further indicates a risk that at least one browsing application operating at the one or more devices associated with the user has a risk of a related malicious modification.

8. The data processing system of claim 1, wherein the instructions, when executed by the processor, further cause the data processing system to:
   receive, from the first device via the communication network, a browsing application identifier that is unique to the browsing application; and
   include the browsing application identifier in the trusted content source rules.

9. The data processing system of claim 8, wherein:
   the rule violation report includes the browsing application identifier, and
   the instructions, when executed by the processor, further cause the data processing system to transmit, to the first device via the communication network, the alert based on the browsing application identifier included in the rule violation report.

10. A method of operating a data processing system for detecting a malicious modification of a browsing application, comprising:
    receiving, via a communication network from a first device executing a browsing application, (i) a request for a web application content and (ii) identification information unique to a user for accessing the web application content using the browsing application;

in response to receiving the identification information, generating a web application user identifier (ID) unique to the user;

transmitting, to the first device via the communication network, web application content data including (i) the requested web application content and (ii) trusted content source rules including a list of trusted sources of content and the web application user ID;

receiving, from the first device via the communication network, a rule violation report generated by the first device based on the list of trusted sources of content, the rule violation report including the web application user ID and indicating that the browsing application has executed content from a source that is not included in the list of the trusted sources of content;

determining, based on the received rule violation report, that a malicious modification of the browsing application has occurred at the first device; and in response to determining the occurrence of the malicious modification of the browsing application at the first device, transmitting, via the communication network to one or more devices associated with the web application user ID, an alert indicating the occurrence of the malicious modification of the browsing application.

11. The method of claim 10, wherein the rule violation report includes indication of manipulation of a tree structure object model of the web application content data.

12. The method of claim 10, wherein the list of trusted sources of content includes a trusted source whitelist.

13. The method of claim 10, wherein:
the trusted content source rules are implemented with a Content Security Policy, and
the method further comprises configuring the Content Security Policy to include instructions for the browsing application to include, in the rule violation report, the indication of the web application user ID.

14. The method of claim 10, wherein the malicious modification of the browsing application includes an installation of a malicious plugin on the browsing application.

15. The method of claim 10, wherein:
the identification information includes a log-in identifier (ID) that is unique to the user for accessing the web application content, and
the web application user ID is generated based on the log-in ID.

16. The method of claim 10, further comprising:
maintaining a login instance record, and
storing information identifying the one or more user devices associated with the web application user ID,
wherein the alert further indicates a risk that at least one browsing application operating at the one or more devices associated with the user has a risk of a related malicious modification.

17. The method of claim 10, further comprising:
receiving, from the first device via the communication network, a browsing application identifier that is unique to the browsing application; and
including the browsing application identifier in the trusted content source rules.

18. The method of claim 17, wherein:
the rule violation report includes the browsing application identifier, and
the method further comprises transmitting, to the first device via the communication network, the alert based on the browsing application identifier included in the rule violation report.

19. A non-transitory computer readable medium containing instructions which, when executed by a processor, cause a computer to perform functions of:

receiving, via a communication network from a first device executing a browsing application, (i) a request for a web application content and (ii) identification information unique to a user for accessing the web application content using the browsing application;

in response to receiving the identification information, generating a web application user identifier (ID) unique to the user;

transmitting, to the first device via the communication network, web application content data including (i) the requested web application content and (ii) trusted content source rules including a list of trusted sources of content and the web application user ID;

receiving, from the first device via the communication network, a rule violation report generated by the first device based on the list of trusted sources of content, the rule violation report including the web application user ID and indicating that the browsing application has executed content from a source that is not included in the list of the trusted sources of content;

determining, based on the received rule violation report, that a malicious modification of the browsing application has occurred at the first device; and in response to determining the occurrence of the malicious modification of the browsing application at the first device, transmitting, via the communication network to one or more devices associated with the web application user ID, an alert indicating the occurrence of the malicious modification of the browsing application.

20. The non-transitory computer readable medium of claim 19, wherein:
the identification information includes a log-in identifier (ID) that is unique to the user for accessing the web application content, and
the web application user ID is generated based on the log-in ID.

* * * * *